United States Patent [19]
Hong et al.

[11] Patent Number: 5,492,634
[45] Date of Patent: Feb. 20, 1996

[54] METHOD FOR TREATING HALOGENATED HYDROCARBONS PRIOR TO HYDROTHERMAL OXIDATION

[75] Inventors: Glenn T. Hong, Tewksbury; William R. Killilea, West Chelmsford; Alain L. Bourhis, Brookline, all of Mass.

[73] Assignee: Modar, Inc., Natick, Mass.

[21] Appl. No.: 382,648

[22] Filed: Feb. 2, 1995

[51] Int. Cl.[6] ................................................. C02F 1/74
[52] U.S. Cl. .................. 210/761; 210/758; 210/908; 210/915
[58] Field of Search ........................... 210/761, 908, 210/909, 758, 763, 915

[56] References Cited

U.S. PATENT DOCUMENTS

| | | |
|---|---|---|
| 2,864,677 | 2/1955 | Eastman . |
| 2,944,396 | 7/1960 | Barton et al. . |
| 3,607,157 | 9/1971 | Schlinger . |
| 3,743,606 | 7/1973 | Marlon et al. . |
| 3,850,738 | 11/1974 | Stewart et al. . |
| 4,113,446 | 9/1978 | Modell et al. . |
| 4,152,218 | 5/1979 | Narita et al. ........................ 203/10 |
| 4,292,953 | 10/1981 | Dickinson . |
| 4,543,190 | 9/1985 | Modell . |
| 4,714,032 | 12/1987 | Dickinson . |
| 4,822,497 | 4/1989 | Hong et al. . |
| 5,106,513 | 4/1992 | Hong . |
| 5,114,623 | 5/1992 | Hutson ........................ 252/631 |
| 5,120,448 | 6/1992 | Dorica et al. ..................... 210/724 |
| 5,393,428 | 2/1995 | Dilla et al. ....................... 210/631 |
| B1 4,338,199 | 11/1988 | Modell . |

FOREIGN PATENT DOCUMENTS 584671  of 1943  United Kingdom .

OTHER PUBLICATIONS

Buelow, S., *Reduction of Nitrate Salts under Hydrothermal Conditions*, Proceedings of the 12th International Conference on the Properties of Water and Steam, ASME, Orlando, Florida, Sep., 1994.

Tester, et al., *Supercritical Water Oxidation Technology*, ACS Symposium Series No. 518, 1993.

*Primary Examiner*—Neil McCarthy
*Attorney, Agent, or Firm*—Pravel, Hewitt, Kimball & Krieger

[57] ABSTRACT

A method for pretreating a halogenated hydrocarbon feed to a hydrothermal oxidation reactor which includes forming a combination of a halogenated hydrocarbon with added alkali under hydrothermal conditions, adding water to the combination, thereby effectuating hydrolysis of the halogenated hydrocarbon so as to liberate halogen ions which are neutralized by the alkali. The neutralized halogen ion, a salt, may be removed from the process prior to or during the oxidation step as brine droplets.

26 Claims, 2 Drawing Sheets

FIGURE 1 [PRIOR ART]

METHOD FOR TREATING HALOGENATED HYDROCARBONS PRIOR TO HYDROTHERMAL OXIDATION

BACKGROUND OF THE INVENTION

1. Field of the Invention

This invention relates to an improved method of oxidizing halogenated hydrocarbons. More particularly, this method provides for pretreating the halogenated hydrocarbon feedstream prior to its introduction into a hydrothermal oxidation reactor. The pretreatment comprises adding an alkali and water at hydrothermal conditions, which result in hydrolysis of the halogenated hydrocarbons and neutralization of the liberated halogen ions.

2. Description of the Related Art

The process of "wet oxidation" has been used for the oxidation of compounds in an aqueous stream for some time. Generally, it involves the addition of an oxidizing agent, typically air or oxygen, to an aqueous stream at elevated temperatures and pressures, with the resultant "combustion" of oxidizable materials directly within the aqueous phase. This wet oxidation process is characterized by operating pressures of 25 to 250 bar (440 to 3630 psia) and operating temperatures of 150° to 370° C. At these conditions, the gas phase oxidation is quite slow and the majority of the oxidation reaction is carried out in the liquid phase. Thus, the reactor operating conditions are typically maintained at or about the saturation point of water, such that at least a part of the water is present in liquid form. This wet oxidation process has several drawbacks. First, it is unsuitable to adequately handle refractory compounds. Second, it is characterized by slow reaction times. Third, due to the low temperature of the process, heat recovery is limited.

In light of such limitations, aqueous oxidation processes were extended to higher temperatures and pressures. In U.S. Pat. No. 2,944,396 to Barton et. al., the addition of a second oxidation stage after a wet oxidation reactor is taught. Unoxidized volatile combustibles which accumulate in the vapor phase of the first stage wet oxidation reactor are oxidized in a second stage, which is operated at temperatures above the critical temperature of water of about 374° C. U.S. Pat. No. 4,292,953 to Dickinson, discloses a modified wet oxidation process for power generation from coal and other fuels in which, as heat is liberated by combustion, the reaction mixture exceeds the critical temperature of water, with operating pressures of about 69 bar (1000 psi) to about 690 bar (10,000 psi) spanning both the sub— and supercritical water pressure ranges. U.S. Pat. No. 4,338,199 to Modell, discloses a wet oxidation process which has come to be known as supercritical water oxidation (SCWO) because in some implementations oxidation occurs essentially entirely at conditions supercritical in temperature (>374° C.) and pressure (> about 3200 psi or 220 bar). SCWO at 500°–600° C. and 250 bar has been shown to give rapid and near complete oxidation of organic compounds. A related process known as supercritical temperature water oxidation (STWO) can provide similar oxidation effectiveness for certain feedstocks but at lower pressure. This process has been described in U.S. Pat. No. 5,106,513 to Hong, and utilizes temperatures in the range of 600° C. and pressures between 25 and 220 bar.

These aqueous oxidation processes achieving substantially complete oxidation will hereinafter be referred to collectively as "hydrothermal oxidation" if carried out at a temperature above about 374° C. and pressures above about 25 bar.

Water at supercritical temperatures and elevated pressures can be useful in carrying out many reactions with organic materials other than complete oxidation. For example, U.S. Pat. No. 2,864,677 to Eastman; U.S. Pat. No. 3,743,606 to Marlon; U.S. Pat. No. 3,607,157 to Schlinger; and, U.S. Pat. No. 4,113,446 to Modell.

The above mentioned hydrothermal oxidation suggests comparison to incineration. Carbon and hydrogen form the conventional combustion products $CO_2$ and $H_2O$. Halogenated hydrocarbons may form strong acids, for example, chlorinated hydrocarbons (CHCs) may give rise to HCl. The formation of strong halogen acids may lead to acid corrosion problems for the processing equipment. In the past, alkali has been added to mitigate acid corrosion problems. The alkali neutralizes the halogen acid and forms a salt. This addition of alkali has, however, caused problems with the precipitating out, as a solid, of the salt formed upon neutralization and the subsequent build-up of the salt in the reactor and downstream equipment, or problems with poor neutralization efficiency due to the interaction of the alkali, e.g., caustic, with the carbon dioxide formed in the oxidation process.

Several patents have recognized that, in the aqueous oxidation of organic compounds, if contaminants or halogen components are present, it may be advantageous to add alkali to the oxidation reactor to neutralize the contaminant or halogen component. U.S. Pat. No. 4,714,032 to Dickinson employs the addition of alkali to the oxidation reactor to neutralize sulfur present in the carbonaceous fuel feed. U.S. Pat. No. 4,543,190 to Modell shows the use of supercritical water to dechlorinate trichloroethylene. The HCl formed is subsequently neutralized with sodium hydroxide and the mixture is then directed to the reactor to be oxidized. This procedure, however, forms high acid conditions and exposes the process equipment to hot acidic environments. Furthermore, these patents do not provide satisfactory solutions to the problems mentioned above, namely build-up of solid precipitated salt on the oxidation reactor and downstream equipment, high corrosion due to acid content and poor neutralization efficiency.

For feedstocks which contain significant amounts of organic halogens, particularly organic chlorine, the aqueous oxidation process can be constrained by conflicting requirements. Use of alkali to mitigate acid corrosion problems can exacerbate the problems of salt deposition. Also, for certain oxidation reactor designs, the feed introduction methods which maximize the degree of neutralization can worsen the salt deposition problem, and feed introduction methods which minimize deposition can result in poor neutralization efficiency.

Thus, there exists a need for a method of pretreating halogenated hydrocarbon feedstreams prior to introducing the feedstreams into an oxidation reactor, whereby acid corrosion and salt precipitation problems are mitigated, and which provides high neutralization efficiencies.

SUMMARY OF THE INVENTION

It is an object of this invention to oxidize halogenated hydrocarbons via a process which minimizes halogen acid corrosion problems, minimizes salt buildup problems, and results in high halogen acid neutralization efficiency.

It further is an object of this invention to provide a method of pretreating a halogenated hydrocarbon feedstream prior to its introduction into a hydrothermal oxidation reactor.

The present invention comprises adding alkali and water under hydrothermal conditions to the halogenated hydrocarbon feedstream so as to effectuate hydrolysis of the halogenated hydrocarbon, thereby liberating halogen ions which are neutralized by the alkali in the absence of significant amounts of carbon dioxide.

BRIEF DESCRIPTION OF THE DRAWINGS

A better understanding of the invention can be obtained when the detailed description of exemplary embodiments set forth below is considered in conjunction with the attached drawings in which.

DETAILED DESCRIPTION OF THE EXEMPLARY EMBODIMENTS

Figure 1:
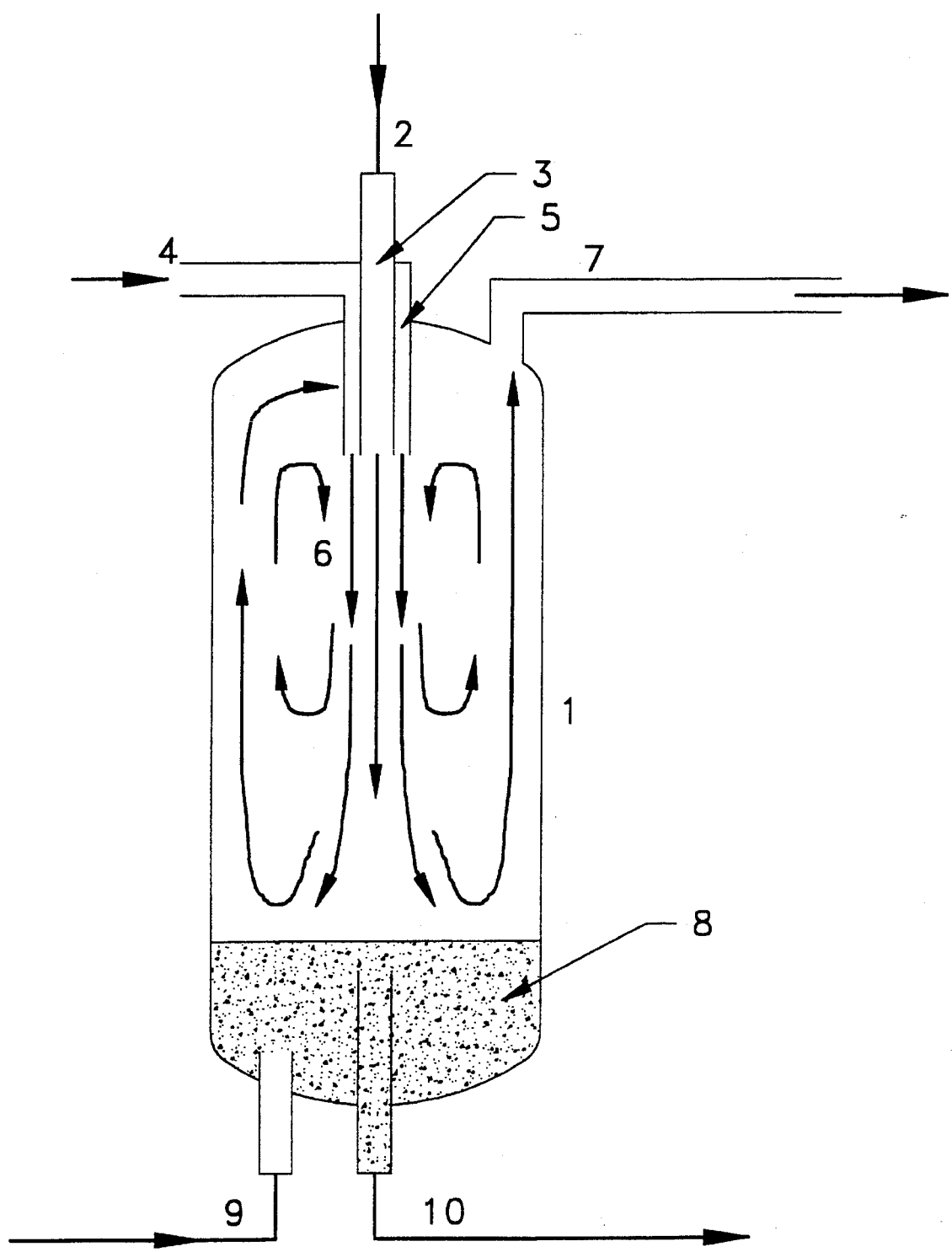
FIG. 1 is a reactor design of a hydrothermal oxidation reactor.

FIG. 1 shows a reactor design which has been used in hydrothermal oxidation reactions. This reactor design is a vessel of the type as described in U.S. Pat. No. 4,822,497 to Hong, hereby incorporated by reference. The operation of this type of oxidation reactor demonstrates the operational problems associated with halogen acid corrosion, salt precipitation, and the need to maintain neutralization efficiency.

A near-ambient temperature feedstream containing chlorinated hydrocarbon (CHC), to which has been added sodium hydroxide, is conducted to the reactor 1 through feed pipe 2, and injected into the reactor by the feed nozzle core 3. Simultaneously oxidant, optionally in admixture with supercritical water, is conducted to the reactor through feed pipe 4 and injected coannularly by the feed nozzle annulus 5. The flows emanating from the feed nozzles 3 and 5 form a fluid jet which entrains hot fluid already present in the reactor. By this mechanism, heat and reaction intermediates are backmixed with the incoming feed, leading to rapid heatup and reaction propagation. Within the reaction zone 6, oxidation occurs and chlorine is liberated from the feed to form hydrogen chloride gas or sodium chloride salt. The bulk of the fluid within the reaction zone exits the reactor through an exit pipe 7 near the top of the vessel. At the reaction zone temperatures which are in the neighborhood of 600° C., the sodium chloride precipitates out as small crystals. These crystals fall onto a pool of cooler fluid 8 maintained in the lower section of the reactor. It is desired that the overhead stream which comprises the bulk of the reactor effluent be largely salt-free. Upon reaching the cooler fluid 8, the sodium chloride crystals dissolve to form a brine. This brine is maintained at a temperature in the neighborhood of 300° C., at which condition its density is about 1 g/cc or ten times the density of the fluid in the upper reactor, resulting in a stable thermocline. One means of maintaining the cool brine at the desired temperature is the injection of cold water through inlet pipe 9. To allow the continuous processing of salt generating feeds, the cool brine may be continuously or intermittently withdrawn through takeoff pipe 10.

It has been found that for certain CHC feeds, the velocity of the fluid exiting the feed nozzle annulus 5 must be relatively high in order to yield efficient neutralization Use of such a "high energy nozzle", however, has the side effect of stimulating overall mixing within the reactor 1. This increases the buildup of solid precipitates on the vessel walls and reduces the amount of solids which reach the brine zone 8. Excessive wall deposits result in a need for frequent cleaning procedures or premature plant shutdowns, both of which can adversely affect plant onstream time and economics. On the other hand, use of low nozzle velocities maximizes the salt which reaches the brine zone 8 and minimizes the salt deposition on the walls, but can result in poor neutralization efficiency. This is believed due to the fact that the caustic entering with the cold feed comes into contact with carbon dioxide, present in the hot fluid entrained by the feed jet, before chlorine has a chance to be liberated from the feed organic. Poor neutralization efficiencies can lead to severe acid corrosion problems in the reactor 1 and downstream heat exchangers.

The present invention solves these problems, while using the same or similar reactor design, by pretreating the feedstream prior to its introduction into oxidation reactor 1. The pretreating step comprises forming a combination of the halogenated hydrocarbon with added alkali under hydrothermal conditions. The term "hydrothermal conditions" refers to a condition not including substantial amounts of oxidant (air or $O_2$) and including a temperature of at least about 150° C. and a pressure of at least about 25 bar. This combination may be formed either by adding alkali to the halogenated hydrocarbon at low pressure and compressing it or by separately compressing the halogenated hydrocarbon and alkali streams, and then combining them. Water is then added to the combination under hydrothermal conditions. The water may be added up to contemporaneously with the alkali. To minimize the occurrence of high acid conditions, and the amount of process equipment exposed to hot acidic environments the water should not be added before the alkali. The alkali and water are added in sufficient amounts and contacted for a time sufficient to hydrolyze and substantially neutralize the halogenated hydrocarbon.

In addition to the hydrolysis of halogens, this pretreating step is believed to involve some rearrangement of molecular structure, such as, e.g., the breaking of carbon-carbon bonds.

Figure 2:
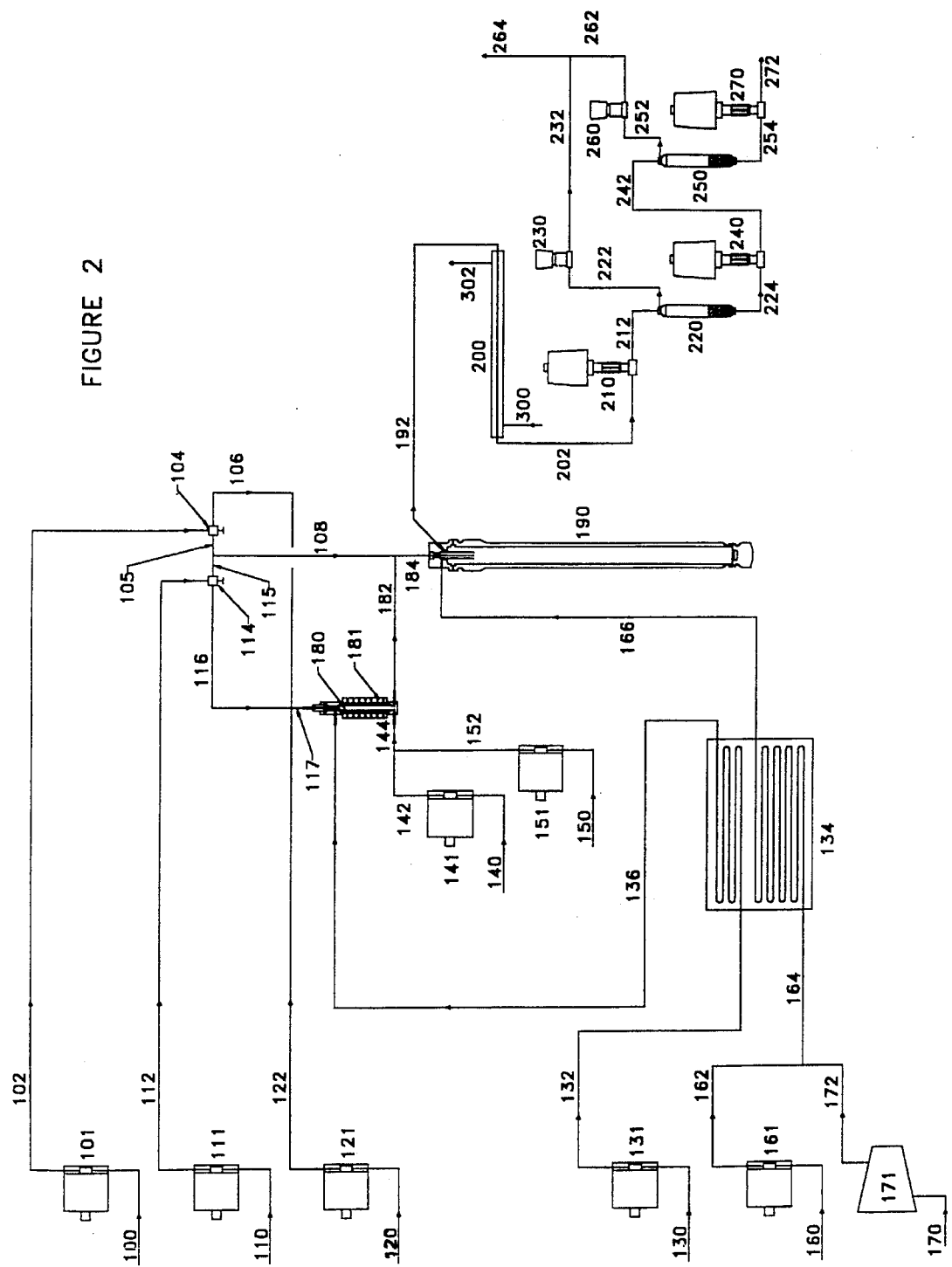
FIG. 2 is a simplified process flow diagram showing the overall process of the present invention and the apparatus used in the below examples.

FIG. 2 shows a simplified process flow diagram showing the overall process of the present invention and the apparatus used in the following examples.

Chlorinated hydrocarbon feed liquid is supplied through line 100 to pump 101, which increases the fluid pressure to the system operating pressure of about 3400 psi. The high pressure fluid leaves the pump through line 102 and proceeds to a 3-way switching valve 104, which directs the fluid either towards the reactor 190 through line 105, or towards the pretreater 180 through line 106. If the fluid is directed through line 105, it passes through lines 108 and then 184 before entering the reactor 190. If the fluid is directed through line 106, it passes through line 117 before entering the pretreater 180.

A 25 wt% aqueous sodium hydroxide solution is supplied through line 110 to pump 111, which increases the fluid pressure to the system operating pressure of about 3400 psi. The high pressure fluid leaves the pump through line 112 and proceeds to a 3-way switching valve 114, which directs the fluid either towards the reactor 190 through line 115, or towards the pretreater 180 through line 116. If the fluid is directed through line 115, it passes through lines 108 and then 184 before entering the reactor 190. If the fluid is directed through line 116, it passes through line 117 before entering the pretreater 180.

An optional stream of diluting water is supplied through line 120 to pump 121, which increases the fluid pressure to the system operating pressure of about 3400 psi. The high pressure fluid leaves the pump through line 122 and proceeds via line 117 to the pretreater 180. This diluting water can be used to help maintain the other feeds entering the pretreater 180 through line 117 at a cool temperature to avoid charring of carbonaceous materials and to prevent plugging of line 117.

Water is supplied through line 130 to pump 131, which increases the fluid pressure to the system operating pressure of about 3400 psi. The high pressure fluid leaves the pump through line 132 and proceeds to an electrical heater 134, which brings the water to a suitable temperature. This temperature is preferably above about 150° C., as below this temperature, hydrolysis reactions are slow and may become impractical depending upon the feed type and rate. The heated water leaves the heater through line 136, and enters the pretreater 180 where it mixes with the feeds entering through line 117. The combination of elevated temperature and caustic causes chlorine to be liberated from the chlorinated hydrocarbon. The caustic also serves to neutralize the hydrochloric acid which would otherwise be formed by chlorine liberation, and thus mitigates the corrosive nature of the stream. The pretreating stream passes in downflow through the pretreater 180. The pretreater 180 itself is a simple pipe or vessel which provides a suitable residence time at the requisite temperature for the pretreater stream. It is jacketed with heaters and insulation to allow maintenance of this temperature.

The hydrolysis and neutralization reactions which occur in the pretreater may occur under hydrothermal conditions including a temperature of at least about 150° C. and a pressure of at least about 25 bar. Preferably, the hydrothermal conditions include a temperature of about 300° C. and a pressure of at least about 100 bar. Most preferably, the hydrothermal conditions include a temperature of at least about 350° C. and a pressure of at least about 200 bar. Generally, from a reaction rate standpoint, higher temperatures and pressures are preferred as these conditions speed up the hydrolysis and neutralization reactions and result in a higher neutralization efficiency. However, pretreating at more severe conditions than required is energy inefficient.

Water is supplied through line 140 to pump 141, which increases the fluid pressure to the system operating pressure of about 3400 psi. The high pressure fluid leaves the pump through line 142 and proceeds to the lower, exit end of the pretreater 180 via line 144. In actual practice, this stream may represent a dilute aqueous waste stream which does not require pretreatment by the method of this invention. Depending on the heating value of the chlorinated hydrocarbon and its flow rate relative to the other input streams, it may be necessary to add an auxiliary fuel to the oxidation reactor. In practice, the auxiliary fuel may be a concentrated organic waste stream which does not require pretreatment by the method of this invention. In the system of FIG. 2, auxiliary fuel is supplied through line 150 to pump 151, which increases the fluid pressure to the system operating pressure of about 3400 psi. The high pressure fluid leaves the pump through line 152 and proceeds to the lower, exit end of the pretreater 180 via line 144. The cold water and auxiliary fuel mix with the hot neutralized stream which has passed through the pretreater 180, and form a warm stream which flows to the reactor 190 through line 182 and 184.

Water is supplied to the reactor 190 through line 160 to pump 161, which increases the fluid pressure to the system operating pressure of about 3400 psi. Air is supplied to compressor 171 through intake duct 170, and exits the compressor at system operating pressure through line 172. The high pressure air mixes with the high pressure water from line 162, and proceeds to the heater 134 through line 164. The heater raises the temperature of the mixed stream to a suitable level, for example about 600° C. This heated stream proceeds to the reactor 190 through line 166, where it mixes with the warm feeds entering the reactor via line 184. As previously described with reference to FIG. 1, these streams are mixed using a concentric nozzle. At the reactor temperature of for example about 600° C., organics are oxidized, salts precipitate and fall to the bottom of the reactor, and a relatively salt-free stream exits the reactor near the top through line 192. Unlike the FIG. 1 embodiment, in the apparatus shown in FIG. 2, for the examples following, no provision was made to remove the brine phase from the lower portion of the reactor.

The single-phase fluid stream exiting the reactor 190 passes through heat exchanger 200 to be cooled to near ambient temperature by exchange with cooling water. The cold cooling water enters the heat exchanger through line 300, while the warm cooling water leaves the heat exchanger through line 302. By virtue of the cooling, the process effluent which leaves the heat exchanger through line 202 is now comprised of separate gas and liquid phases. It has its pressure dropped from 3400 psi to about 1500 psi through control valve 210. The partially depressurized stream flows through line 212 to the medium pressure separator 220 which segregates the gas and liquid phases. The gas phase is comprised primarily of nitrogen, residual oxygen which was not consumed during the reaction, and some of the carbon dioxide which was produced by the reaction. It leaves the separator near the top through line 222, and has its pressure reduced to near ambient through back pressure regulator 230. The depressurized gas flows through lines 232 and 264, at which point it is vented or sampled for analysis. The liquid leaves the medium pressure separator 220 from the bottom, passing through line 224 to the control valve 240 which drops the pressure to about 100 psi. This pressure reduction leads to the effervescence of most of the remaining carbon dioxide reaction product from the liquid phase. The low pressure gas/liquid stream flows through line 242 to the low pressure separator 250. The gas, primarily $CO_2$, leaves from the top of the separator through line 252, and has its pressure reduced to near ambient through back pressure regulator 260. The depressurized gas flows through lines 262 and 264, at which point it is vented or sampled for analysis. The liquid leaves the low pressure separator 250 from the bottom, passing through line 254 to the control valve 270 which drops the pressure to near ambient. The liquid, typically near-potable quality water, then flows through line 272 to be sampled or disposed of.

Several operational problems are encountered by the precipitation of salt in the hydrothermal oxidation reactor. First, there is the overall problem, as discussed above, of collecting and removing the solid salt precipitate formed, while preventing the formation of the salt along the reactor vessel walls, which may cause premature shutdown of equipment to clean. Also, it has been found that the generation of salt in the oxidation reactor results in a certain fraction of very fine particulates. These fine particulates tend to be entrained in the overhead stream of the oxidation reactor as described in FIG. 1, rather than being deposited in the brine. This can lead to plugging of downstream equipment and lines.

In one embodiment, the present invention provides for the formation and removal of salt from the pretreating step such that the salt does not enter the oxidation reactor causing the above-mentioned problems. It has been found that the majority of the salt can be removed at the pretreatment step due to the phase behavior of salt and water under hydrothermal conditions. The phase behavior of salts in supercritical solutions is discussed in U.K. Patent 584,671, incorporated by reference. At a certain point, which is dependent upon the type of salt formed, its concentration in the solution, and its interaction with other compounds present, denser brine droplets form and may be collected and removed at the pretreater step. In the sodium chloride-water system, at a pressure of about 250 bar and temperatures between about 390° and about 450° C., these dense brine droplets form. It is believed that a potassium chloride-water system will form dense brine droplets at a pressure of about 100 bar and a temperature of about 400° C., and that a sodium bromide-water system will form dense brine droplets at a pressure of about 100 bar and a temperature of about 425° C. It is believed that these dense droplets contain the majority of the salt present in the stream during and after pretreating. These brine droplets are denser than the water phase and may be removed from the pretreater step due to this higher density. These brine droplets may be coalesced by conventional techniques such as baffles or a hydrocyclone in the pretreater or on its outlet stream. The denser brine droplets may either be collected and removed from the stream prior to feeding it to the oxidation reactor or retained within the stream to the oxidation reactor. Here, depending upon the feed type, feed rate, .salt formed, etc., there are advantages to each option.

It may be preferred to remove the brine droplets in the pretreatment step or after the pretreatment step, prior to the oxidation reactor, as it may be easier to handle and remove the salt as a liquid brine solution, prior to the formation of the solid precipitate.

Optionally, it may be preferred to retain the brine droplets within the stream to the oxidation reactor. This could be advantageous in several respects. First, this would oxidize any organics contained within the droplets. Also, the sending of previously formed brine droplets into the oxidation reactor may reduce the formation of smaller salt fines in the reactor. Further, this may serve to better direct brine droplets to the brine pool at the bottom of the reactor. Also, at higher temperatures, i.e., above about 450° C., the brine droplets may be dried out and converted to solid particles of a larger size than would otherwise be formed. These larger sized particles would then be easier to separate and collect.

In either case, in forming the denser brine droplets, care and experimentation should be taken so as to form the optimum sized drops so as to ensure the oxidation of organic material. For example, if the brine droplets are sent to the oxidation reactor, the optimum size of the droplets needs to be chosen to ensure adequate oxidation of any organic material contained within the droplets.

Preferably, the brine droplets include more than about 90 percent of the halogen ions originally present in the CHC.

EXAMPLES

An apparatus similar to that set forth in FIG. 2 was used in the experiments described in the following examples. The annular velocity for the reactor feed nozzle was selected to be about 8 feet/sec in all experiments. Prior experience had shown this velocity to result in significant incomplete neutralization when run without pretreating.

Example 1

In this test the chlorinated hydrocarbon tested was perchloroethylene (PCE), $C_2Cl_4$. Table 1a shows the feed rates. Table 1b shows typical results obtained with:

a) Both the PCE (line 102) and a 25 wt% aqueous sodium hydroxide (caustic) solution (line 112) were fed directly to the reactor 190 (Run 547a), i.e., flow through lines 105 and 115 in FIG. 2.

b) PCE going to the pretreater and then to the reactor, and caustic going directly to the reactor (Run 547b), i.e., flow through lines 106 and 115 in FIG. 2.

c) Both PCE and caustic going to the pretreater and then to the reactor (Run 547c), i.e., flow through lines 106 and 116 in FIG. 2.

The third column of Table 1b shows the approximate temperature within the pretreater, while the fourth column shows the pretreater residence time, i.e., the amount of time the process stream spent within the pretreater. The fifth column of Table 1b shows the amount of water present in the process stream within the pretreater. The last column in Table 1b indicates the effectiveness of neutralization as determined by the hydrochloric acid content of the liquid effluent (stream 272 in FIG. 2) as compared to the amount of chlorine in the feed.

The first data point, Run 547a, indicates the relatively poor neutralization efficiency of 56% obtained with the low energy nozzle. Run 547b shows that pretreating of the PCE in the absence of caustic does little to improve neutralization efficiency. Run 547c shows that the presence of caustic in the pretreater greatly enhances the degree of neutralization attained, however, for many applications neutralization efficiencies of greater than 90–95% are desirable.

TABLE 1a

| | Feed Rates, Compositions in wt. %. | | | |
|---|---|---|---|---|
| Run | PCE cc/min | 25% NaOH cc/min | Coolant $H_2O$ cc/min | Heating $H_2O$ cc/min |
| 547a | 0.12 | 1.2 | NA | NA |
| 547b | 0.11 | 1.2 | 2.2 | 15.5 |
| 547c | 0.15 | 0.8 | 1.8 | 16.0 |

TABLE 1b

| | | Perchloroethylene pretreating at 380° C. | | | |
|---|---|---|---|---|---|
| Run | Feeds to Pretreater | Pretreater °C. | Pretreater sec | $H_2O$ wt % | Neutralization Efficiency, % |
| 547a | None | NA | NA | NA | 56 |
| 547b | PCE | 380 | 19 | 97 | 60 |
| 547c | PCE + NaOH | 380 | 20 | 97 | 86 |

Example 2

In this test the chlorinated hydrocarbon tested was again PCE, but higher pretreater temperatures were used. Table 2a shows the feed rates. As shown in Table 2b, neutralization for the baseline case 548a, i.e., with PCE and caustic bypassing the pretreater, was somewhat; better than in Run 547a. This may be a result of the fact that the fuel and water stream entering the reactor via line 182 in FIG. 2 was somewhat warmer than in the previous example. In any case, the trend of Run 548 is the same as in Run 547. While a residence time of 11 seconds at a temperature of 423° C. showed improvement in neutralization efficiency without caustic present in the pretreater, the neutralization efficiency was still unsatisfactory. The dramatic effect of caustic addition to the pretreater is shown by Run 548c, where at the lower temperature of 410° C. 12 seconds was sufficient to give very high neutralization efficiency.

TABLE 2a

| | Feed Rates, Compositions in wt. %. | | | |
|---|---|---|---|---|
| Run | PCE cc/min | 25% NaOH cc/min | Coolant H$_2$O cc/min | Heating H$_2$O cc/min |
| 548a | 0.14 | 0.8 | NA | NA |
| 548b | 0.16 | 0.9 | 2.5 | 9.5 |
| 548c | 0.50 | 3.2 | 0 | 9.0 |

TABLE 2b

Perchloroethylene pretreating at temperatures above 380° C.

| Run | Feeds to Pretreater | Pretreater °C. | Pretreater sec | H$_2$O wt % | Neutralization Efficiency, % |
|---|---|---|---|---|---|
| 548a | None | NA | NA | NA | 69 |
| 548b | PCE | 423 | 11 | 96 | 87 |
| 548c | PCE + NaOH | 410 | 12 | 87 | 98 |

Example 3

This test utilized one of the most refractory chlorinated hydrocarbons known, hexachlorobenzene (HCB). As HCB is a solid, it was necessary to dissolve it in a suitable solvent. The feed mixture utilized was 2.7 wt% HCB in benzene (C$_6$H$_6$). This test did not compare the neutralization attained with other configurations, but only evaluated the effectiveness of the process with caustic present in the pretreater. Table 3a shows the feed rates. As shown in Table 3b, neutralization efficiency was good but not quite as high as desired. The more refractory nature of HCB as compared to PCE and the short pretreater residence time may have led to this result. It is believed that use of somewhat longer residence time and/or slightly higher temperature would provide a higher level of neutralization.

TABLE 3a

| | Feed Rates, Compositions in wt % | | | |
|---|---|---|---|---|
| Run | 2.7% HCB in benzene cc/min | 25% NaOH cc/min | Coolant H$_2$O cc/min | H$_2$O cc/min |
| 551a | 4.9 | 0.9 | 1.3 | 26.5 |

TABLE 3b

Hexachlorobenzene pretreating.

| Run | Feeds to Pretreater | Pretreater °C. | Pretreater sec | H$_2$O wt % | Neutralization Efficiency, % |
|---|---|---|---|---|---|
| 551a | HCB + NaOH | 420 | 5 | 86 | 91 |

Example 4

This test utilized a third chlorinated hydrocarbon, monochlorobenzene (MCB), C$_6$H$_5$Cl. As in Example 3, this test did not compare the neutralization attained with other configurations, but only evaluated the effectiveness of the process with caustic present in the pretreater. Again, neutralization efficiency was good, but not quite as high as desired. It is believed that use of a longer residence time and/or higher temperature would provide a higher level of neutralization.

TABLE 4a

| | Feed Rates, Compositions in wt. %. | | | |
|---|---|---|---|---|
| Run | MCB cc/min | 25% NaOH cc/min | Coolant H$_2$O cc/min | Heating H$_2$O cc/min |
| 551b | 3.0 | 3.9 | 1.3 | 30.0 |

TABLE 4b

| | Monochlorobenzene pretreating. | | | |
|---|---|---|---|---|
| Run | Feeds to Pretreater | Pretreater °C. | Pretreater sec | H₂O wt % | Neutralization Efficiency, % |
| 551b | MCB + NaOH | 408 | 4 | 89 | 91 |

Example 5

One important aspect of the pretreating method is the amount of water required to effect the pretreating. It was believed that the minimum amount of water which could be used in the pretreater would be determined not by the effectiveness of neutralization, but by the occurrence of charring of feed constituents. Charring involves the formation of solid carbonaceous particulates which can be more difficult to oxidize and which can also lead to mechanical difficulties by causing flow blockages. For this reason, PCE mixed with paraffin (mineral) oil and kerosene was used as the feed. Kerosene is comprised of alkanes with 12 to 18 carbons, while paraffin oil is believed to include alkanes with more than 20 carbons; these materials are believed prone to charring. The run was successful in attaining hydrolysis and neutralization with a water:organic mass ratio of less than 3:1 at a temperature of about 400° C., as shown in Table 5b. A small amount of char was found in the pretreater upon disassembly.

TABLE 5a

| | Feed Rates, Compositions in wt % | | | |
|---|---|---|---|---|
| Run | 10% PCE + 45% kerosene + 45% paraffin oil cc/min | 25% NaOH cc/min | Coolant H₂O cc/min | Heating H₂O cc/min |
| 552 | 6.8 | 1.9 | 0 | 15 |

TABLE 5b

| | PCE in oil preheating | | | |
|---|---|---|---|---|
| Run | Feeds to Pretreater | Pretreater °C. | Pretreater sec | H₂O wt % | Neutralization Efficiency, % |
| 552 | PCE + oil + NaOH | 402 | 7 | 72 | 95 |

Example 6

This test utilized the machining lubricant Trimsol, a product of the Master Chemical Corporation, Perrysburg, Ohio, the feed rate of which is shown in Table 6a and the composition of which is shown in Table 6b. The Trimsol feed contained chlorinated hydrocarbons probably larger in size than the feeds in the previous examples, as well as sulfur, believed to be in the form of sulfonate groups on surfactant molecules. As shown in Table 6c, pretreating in the presence of caustic increased neutralization efficiency from 83 to 97% (based on chloride only). Also, it was found possible to reduce the water to the pretreater to twice the Trimsol flow rate with a preheater temperature of 394° C., while maintaining high neutralization efficiency.

TABLE 6a

| | Feed Rates, Compositions in wt. %. | | | |
|---|---|---|---|---|
| Run | Trimsol cc/min | 25% NaOH cc/min | Coolant H₂O cc/min | Heating H₂O cc/min |
| 554a | 2.8 | 2.0 | NA | NA |
| 554b | 5.5 | 2.7 | 0 | 25 |

TABLE 6b

| Trimsol composition. | | | |
|---|---|---|---|
| Component Analysis | | Elemental Analysis | |
| Component | wt % | Element | wt % |
| Petroleum oil | 30–40 | Carbon | 68.4 |
| Petroleum sulfonate | 20–30 | Hydrogen | 10.8 |
| Chlorinated alkene polymer | 20–30 | Oxygen | 7.5 |
| Nonionic surfactant | 1–10 | Chlorine | 11.1 |
| Aromatic alcohol | 1–10 | Sulfur | 1 |
| Propylene glycol ether | 1–10 | Nitrogen | 0.9 |
| Propylene glycol | <1 | Sodium | 0.5 |
| Substituted indole | <1 | | |
| Blue-green dye | <1 | | |
| Silicone defoamer | <1 | | |
| Water | Balance | | |

TABLE 6c

| | | Trimsol Pretreating. | | | |
|---|---|---|---|---|---|
| Run | Feeds to Pretreater | Pretreater °C. | Pretreater sec | H₂O wt % | Neutralization Efficiency, % |
| 554a | None | NA | NA | NA | 83 |
| 554b | Trimsol + NaOH | 412 | 5 | 84 | 97 |

With regard to Example 5 above, generally, it is preferred to limit the amount of water present in both the pretreater and the oxidation reactor to that level which will prevent an undesirable level of charring while still providing for the adequate hydrolysis, neutralization and oxidation of the halogenated hydrocarbon feed stream. The amount of water is to be limited, since any additional water over the minimum amount will consume unneeded energy employed in compression and heating. Depending upon the halogenated hydrocarbon feed and the conditions of the process, to meet the above criteria, the total mass of water present in the mixture may be in an amount of about 1 time to about 1000 times the mass amount of halogenated hydrocarbon present.

The oxidation reactions occur under hydrothermal oxidation conditions including a temperature of at least about 374° C. and a pressure of at least about 25 bar. Preferably, the hydrothermal oxidation conditions include a temperature of at least about 400° C. and a pressure of at least about 100 bar. Most preferably, the hydrothermal oxidation conditions include a temperature of at least about 450° C. and a pressure of at least about 200 bar.

The oxidizing agent may be any suitable for use in hydrothermal oxidation reactions, e.g., air, $O_2$, enriched air, hydrogen peroxide, nitric acid, and ozone. The preferred oxidizing agents are air, $O_2$, and enriched air, as these oxidizing agents are cost effective and provide a suitable oxidation rate.

The process of the present invention may be directed toward treatment of toxic or hazardous halogenated hydrocarbon waste. As such, it is believed that the method of the present invention is particularly suited to the treatment of halogenated hydrocarbons such as chlorinated hydrocarbons, chlorofluoro hydrocarbons, and fluoro hydrocarbons as these compounds may be major constituents of waste streams, causing environmental concerns and the present invention is believed to provide complete oxidation of these compounds.

While the alkali selected may be any alkali suitable for the hydrolysis and neutralization of the halogen ions in the pretreater, the preferred alkali include sodium hydroxide, potassium hydroxide, calcium hydroxide, magnesium hydroxide, magnesium oxide, and calcium oxide. These alkali are believed preferable from both the standpoint of cost and effectiveness in the hydrolysis and neutralization reactions.

Generally, it is preferred that the alkali is added in about the stoichiometric equivalent of the halogen ions present in the halogenated hydrocarbon. Too little alkali will result in an acidic medium; likewise, too much alkali will result in a basic medium. These are to be avoided as either an acidic or a basic medium may result in corrosion or other operational problems.

Preferably, the alkali is employed and the operating conditions and residence time of the pretreater are set such that neutralization in the pretreater neutralizes more than about 90 percent of the halogen ions present, although this can vary depending on the halogen content of the feed. Neutralization lower than about 90% can result in excessive unreacted alkali being fed to the oxidation reactor where it may react with $CO_2$, forming an undesired alkali-carbonate.

Although the invention has been described with reference to its preferred embodiments, those of skill in the art may from this description appreciate changes and modifications which can be made herein which do not depart from the scope and spirit of the invention as described in claims hereafter.

We claim:

1. In a process for oxidizing halogenated hydrocarbons at temperatures above about 374 °C. and at pressures above about 25 bar, the improvement comprising introducing into an oxidation reactor an oxidizing agent and pretreated halogenated hydrocarbon, wherein the pretreated halogenated hydrocarbon is the reaction product of halogenated hydrocarbon, alkali and water at hydrothermal conditions sufficient to substantially neutralize the halogenated hydrocarbon and further wherein a dense brine phase, formed during the reaction of halogenated hydrocarbon, alkali and water is, optionally, collected and removed prior to the introduction of the pretreated halogenated hydrocarbon into the oxidation reactor.

2. A method of oxidizing a halogenated hydrocarbon, comprising:

(a) adding alkali and water to halogenated hydrocarbon at hydrothermal conditions, wherein the alkali and water are added in an amount and for a time sufficient to hydrolyze and substantially neutralize the halogenated hydrocarbon;

(b) optionally collecting and removing a dense brine phase, formed in step (a), from the hydrolyzed and substantially neutralized halogenated hydrocarbon; and (c) feeding an oxidizing agent and the hydrolyzed and substantially neutralized halogenated hydrocarbon into an oxidation reactor and reacting at supercritical conditions said halogenated hydrocarbon and oxidizing agent; and (d) removing the oxidation products from the oxidation reactor.

3. A method for oxidizing a halogenated hydrocarbon, comprising:

(a) adding alkali and water to halogenated hydrocarbon at non-oxidative conditions wherein the temperature is at least about 150 ° C. and the pressure is at least about 25 bar, wherein the alkali and water are added in an amount and for a time sufficient to hydrolyze and substantially neutralize the halogenated hydrocarbon;

(b) optionally separating a dense brine phase, formed in step (a), from the hydrolyzed and substantially neutralized halogenated hydrocarbon;

(c) feeding the hydrozyzed and substantially neutralized hydrocarbon and an oxidizing agent into an oxidation reactor and reacting said hydrocarbon and oxidizing agent at supercritical conditions; and (d) removing the oxidation products from the oxidation reactor.

4. The method of claim 3, wherein the step of causing the hydrolyzed and substantially neutralized halogenired hydrocarbon to form a dense brine phase comprises holding the halogenated hydrocarbon at a pressure of about 250 bar end a temperature of between about 390 °C. end about 450 °C.

5. The method of claim 3, wherein the alkali is selected from the group consisting of sodium hydroxide, potassium hydroxide, calcium hydroxide, magnesium hydroxide, magnesium oxide and calcium oxide.

6. The method of claim 3, wherein greater than about 90 percent of the halogenated hydrocarbon is neutralized.

7. The method of claim 1, further comprising the steps of:

introducing the dense brine phase into the oxidation reactor.

8. The method of claim 1, wherein the step of causing the pretreated halogenated hydrocarbon to form a dense brine phase comprises holding the pretreated halogenated hydrocarbon at a pressure of about 250 bar and a temperature of between about 390 °C. and about 450 °C.

9. The method of claim 1, wherein the dense brine phase includes more than about 90 percent of the halogen atoms introduced via the halogenated hydrocarbon.

10. The method of claim 1, wherein the halogenated hydrocarbon is selected from the group consisting of chlorinated hydrocarbons, chloro-fluoro hydrocarbons, and fluoro hydrocarbons.

11. The method of claim 1, wherein the alkali is selected from the group consisting of sodium hydroxide, potassium hydroxide, calcium hydroxide, magnesium hydroxide, magnesium oxide and calcium oxide.

12. The method of claim 1, wherein the alkali is added in about the stoichiometric equivalent of halogen atoms introduced via the halogenated hydrocarbon.

13. The method of claim 1, wherein the total mass of water percent in the pretreated halogenated hydrocarbon is from about 1 to about 1000 times the mass of halogenated hydrocarbon present.

14. The method of claim 1, wherein the oxidation occurs at a temperature of at least about 400° C. and a pressure of at least about 100 bar.

15. The method of claim 1, wherein the oxidation occurs at a temperature of at least about 450° C. and a pressure of at least about 200 bar.

16. The method of claim 1, wherein greater than about 90 percent of the halogenated hydrocarbon is neutralized.

17. The method of claim 2, further comprising the step of:

introducing the dense brine phase into the reactor.

18. The method of claim 2, wherein the step of causing the hydrolyzed and substantially neutralized halogenated hydrocarbon to form a dense brine phase comprises holding the halogenated hydrocarbon at a pressure of about 250 bar and a temperature of between about 390 °C. and about 450° C.

19. The method of claim 2, wherein the dense brine phase includes more that about 90 percent of the halogen atoms introduced via the halogenated hydrocarbon.

20. The method of claim 2, wherein the halogenated hydrocarbon is selected from the group consisting of chlorinated hydrocarbons, chloro-fluoro hydrocarbons, and fluoro hydrocarbons.

21. The method of claim 2, wherein the alkali is selected from the group consisting of sodium hydroxide, potassium hydroxide, calcium hydroxide, magnesium hydroxide, magnesium oxide and calcium oxide.

22. The method of claim 2, wherein the alkali is added in about the stoichiometric equivalent of halogen atoms introduced via the halogenated hydrocarbon.

23. The method of claim 2, wherein the total mass of water present in the treated hydrocarbon from step (a) is from about 1 to about 1000 times the mass of halogenated hydrocarbon present.

24. The method of claim 2, wherein the temperature in steps (c)–(d) is at least about 400 °C. and the pressure in steps (c)–(d) is at least about 100 bar.

25. The method of claim 2, wherein the temperature in steps (c)–(d) is at least about 450 °C. and the pressure in steps (c)–(d) is at least about 200 bar.

26. The method of claim 2, wherein greater than about 90 percent of the halogenated hydrocarbon is neutralized.

* * * * *